US009100838B2

(12) United States Patent
Lundquist et al.

(10) Patent No.: US 9,100,838 B2
(45) Date of Patent: Aug. 4, 2015

(54) RAIL SYSTEM HAVING A WIRED COMMUNICATION ZONE

(71) Applicant: Electro-Motive Diesel, Inc., La Grange, IL (US)

(72) Inventors: Steve D. Lundquist, Naperville, IL (US); Harinder Singh Lamba, Downers Grove, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 40 days.

(21) Appl. No.: 13/953,147

(22) Filed: Jul. 29, 2013

(65) Prior Publication Data

US 2015/0031306 A1 Jan. 29, 2015

(51) Int. Cl.
| | |
|---|---|
| *G05D 1/00* | (2006.01) |
| *H04W 16/18* | (2009.01) |
| *H04B 3/60* | (2006.01) |
| *B61L 15/00* | (2006.01) |
| *B61L 27/00* | (2006.01) |
| *H04B 3/54* | (2006.01) |
| *G01C 22/00* | (2006.01) |
| *B60M 3/00* | (2006.01) |

(52) U.S. Cl.
CPC ........... *H04W 16/18* (2013.01); *B61L 15/0027* (2013.01); *B61L 27/0005* (2013.01); *H04B 3/54* (2013.01); *H04B 3/60* (2013.01); *B60M 3/00* (2013.01)

(58) Field of Classification Search
CPC .............................. B61L 27/00; B61L 27/0061
USPC ....................................... 701/19, 22; 246/2 R
See application file for complete search history.

(56) References Cited

U.S. PATENT DOCUMENTS

| | | | |
|---|---|---|---|
| 8,294,286 B2 | 10/2012 | Hunter | |
| 8,342,103 B2 | 1/2013 | Barbee et al. | |
| 8,371,230 B2 | 2/2013 | Kumar | |
| 8,427,000 B2 | 4/2013 | Ignatiev et al. | |
| 8,441,143 B2 | 5/2013 | Goodermuth et al. | |
| 8,457,815 B2 | 6/2013 | Daum et al. | |
| 2010/0109604 A1 | 5/2010 | Boys et al. | |
| 2011/0184601 A1* | 7/2011 | Shapery | 701/22 |
| 2011/0284700 A1* | 11/2011 | Brand et al. | 246/28 R |
| 2012/0318332 A1 | 12/2012 | Cooper | |

FOREIGN PATENT DOCUMENTS

| | | |
|---|---|---|
| CA | 2 785 516 | 6/2011 |
| EP | 2 476 573 | 7/2012 |
| EP | 2 505 416 | 10/2012 |

* cited by examiner

*Primary Examiner* — Lee Nguyen
(74) *Attorney, Agent, or Firm* — Finnegan, Henderson, Farabow, Garrett & Dunner, LLP

(57) ABSTRACT

A rail system is disclosed. The rail system may have a track including a wireless communication zone and a wired communication zone. The rail system may also have an electrical contact that extends along the wired communication zone. The electrical contact may be configured to transmit electrical energy and a data communication. The rail system may further have a power source electrically connected to the electrical contact. The rail system may additionally have a controller selectively electrically connectable to the electrical contact and a wireless network. The power source may be configured to transmit electrical energy through the electrical contact. The controller may be configured to switch between data communication transmission via the wireless network and via the electrical contact, based at least in part on a location of a rail vehicle within the rail system.

18 Claims, 3 Drawing Sheets

RAIL SYSTEM HAVING A WIRED COMMUNICATION ZONE

TECHNICAL FIELD

The present disclosure is directed to a rail system and, more particularly, to a rail system having a wired communication zone.

BACKGROUND

Rail systems include control equipment that implement control processes to manage a network of rail vehicles. Control equipment includes management devices located onboard locomotives and offboard at control stations positioned throughout a particular rail system, as well as wayside equipment, such as axle hot box detectors, wheel load detectors, track switches, speed restriction signs, and signal lights. As locomotives travel throughout a rail system, an onboard management device, such as a train management computer (TMC), communicates with the control stations (including a global control station), wayside equipment, and other locomotives within the rail system to coordinate movement of the locomotives on the rail system tracks.

Due to the mobile nature of locomotives, wireless communication networks have been used to support rail system communication. Wireless networks provide mobile communication without the need for a network of physical communication links to connect each component of a rail system. While wireless networks have this and other advantages over wired networks, they may be less reliable. In particular, wireless networks may be restricted by range (only particular areas may be covered by the network), and/or by bandwidth, such as in areas with high wireless data traffic. Wired communication systems can overcome some of these problems, as they can be more reliable and may support higher bandwidth data traffic.

One example of a wired communication system is described in U.S. Pat. No. 8,457,815 that issued to Daum et al. on Jun. 4, 2013 ("the '815 patent"). The '815 patent discloses a communication system that utilizes conductive pathways, such as track rails, to transmit data signals. Data signals are electrically communicated through the conductive pathways to transmit messages, such as a status messages, between rail system components, such as rail vehicles, wayside equipment, and management devices.

While the communication system of the '815 patent may be an alternative to conventional wired communication systems, it may be less than optimal. In particular, the communication system of the '815 patent relies on a complete network of conductive pathways, such as electrified rails or overhead catenaries, to support data communication. Rail systems that rely on these power networks require an expansive infrastructure to supply power to the locomotives on the entire track, which may be expensive. Further, the communication system of the '815 patent lacks integration with wireless networks.

The present disclosure is directed to overcoming one or more of the problems set forth above and/or other problems of the prior art.

SUMMARY

In one aspect the present disclosure is directed to a rail system. The rail system may include a track including a wireless communication zone and a wired communication zone. The rail system may also include an electrical contact that extends along the wired communication zone. The electrical contact may be configured to transmit electrical energy and a data communication. The rail system may further include a power source electrically connected to the electrical contact. The rail system may additionally include a controller selectively electrically connectable to the electrical contact and a wireless network. The power source may be configured to transmit electrical energy through the electrical contact. The controller may be configured to switch between data communication transmission via the wireless network and via the electrical contact, based at least in part on a location of a rail vehicle within the rail system.

In another aspect, the present disclosure is directed to a method of operating a rail system. The method may include selectively connecting a controller to a wireless network. The method may also include transmitting a first data communication to or from the controller over the wireless network. The method may further include selectively connecting an electrical contact to a rail vehicle while the rail vehicle travels on a powered section of a track. The method may additionally include initiating power transmission to or from the rail vehicle via the electrical contact when the rail vehicle travels on the powered section of the track. The method may also include transmitting a second data communication to or from the controller via the electrical contact.

DETAILED DESCRIPTION

Figure 1:
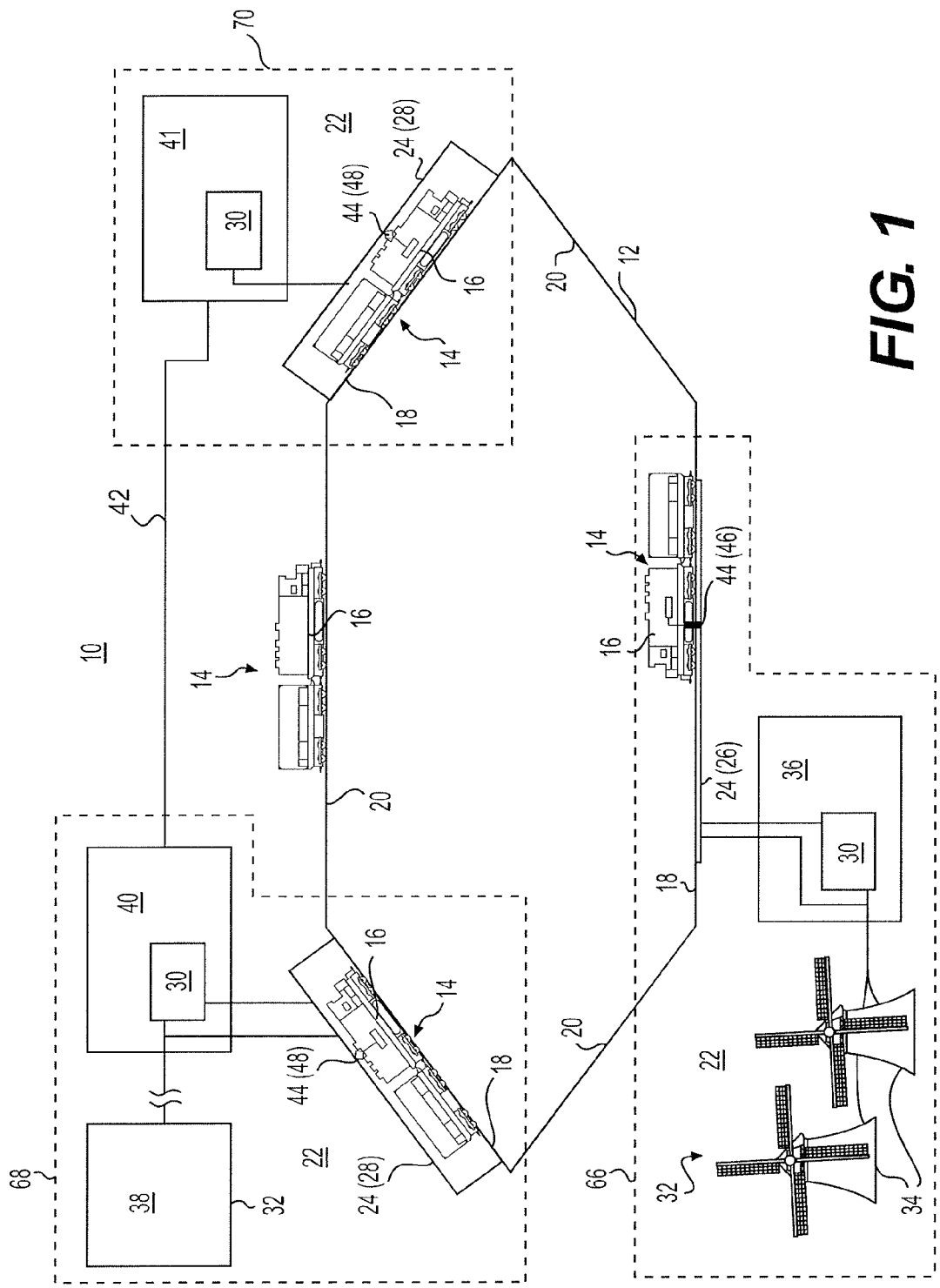
FIG. 1 depicts a schematic illustration of an exemplary disclosed rail system.

FIG. 1 schematically illustrates an exemplary rail system 10 consistent with certain disclosed embodiments. Rail system 10 may include a network of tracks 12 that support various vehicles 14. Tracks 12 may be any type of transportation pathway, such as railroad tracks, subway rails, trolley tracks, etc., on which vehicles 14 may travel. Tracks 12 may be interconnected or separated, such that some vehicles 14 travel only on some tracks 12 and other vehicles 14 travel only on other tracks 12. Each vehicle 14 may be any type of vehicle capable of traveling on tracks 12. For example, vehicles 14 may be rail vehicles such as locomotives, railcars (e.g., freight and/or passenger railcars), subway cars, trolley cars, etc. Vehicles 14 may be arranged into consists (e.g., trains) or operate independently.

In an exemplary embodiment, each vehicle 14 may include an electrically-powered locomotive 16. Locomotive 16 may be arranged to be primarily operated with an electrical power system, but may include a mechanical power source, such as a diesel engine, as a backup power system in case of failure or unavailability of the electrical power system. In other embodiments, locomotive 16 may run on a combination electrical and mechanical power system (e.g., a diesel-electric locomotive). Locomotive 16 may be configured to convert electrical energy into mechanical energy to produce tractive power to move vehicle 14 along track 12, such as through traction motors (not shown).

Rail system 10 may be arranged to provide electrical energy to locomotives 16 for use in traveling on tracks 12. In the exemplary rail system 10 depicted in FIG. 1, track 12 may include a plurality of powered sections 18 and a plurality of unpowered sections 20. Each powered section 18 may be configured to provide electrical energy to locomotives 16 within the powered section 18 for immediate and/or eventual use in driving locomotive 16 on track 12. Locomotives 16 traveling in unpowered sections 20 may need to rely on onboard power sources or stored energy to provide power to drive locomotive 16 on track 12 within a respective unpowered section 20. In some embodiments, a length of the unpowered sections 20 may be much greater than a length of the powered sections 18. In other words, powered sections 18 may only make up relatively short portions of track 12, as compared to unpowered sections 20. For example, a given powered section 18 may be only a few miles long, while an unpowered section 20 may be hundreds of miles long or even greater.

Powered sections 18 may be configured to provide electrical energy to locomotives 16 via one or more energy exchange stations 22 situated at various locations near track 12. Each energy exchange station 22 may include an electrical contact 24 located near the portion of track 12 within the respective powered section 18. Electrical contact 24 may be an offboard device configured to transmit and/or receive electrical energy to or from another contact device. For example, electrical contact 24 may be an electrified rail 26 (e.g., third rail), overhead power line 28 (e.g., catenary), or other device configured to act as an electrical power source to which locomotives 16 may connect. Electrical contact 24 may extend along only the associated powered section 18 of track 12. Energy exchange stations 22 may include various components configured to supply electrical power to electrical contact 24. These components may include one or more energy storage devices 30 and/or one or more power sources 32.

Energy storage devices 30 may be arranged to store electrical energy. For example, energy storage devices 30 may include one or more rechargeable batteries configured to receive, store, and transmit electrical energy. In other embodiments, energy storage device 30 may include a mechanical storage system, such as a hydrogen storage system or a mechanical flywheel. A combination of electrical and mechanical energy storage devices 30 is also possible.

Each power source 32 may be any system or device configured to generate electrical energy (or mechanical energy that can be converted into electrical energy) for supplying electrical energy to electrical contacts 24. In an exemplary embodiment, power source 32 may be a renewable energy source 34. Renewable energy source 34 may be configured to generate electrical energy by harnessing one or more types of renewable energy. For example, renewable energy source 34 may be configured to utilize wind or solar energy to produce electrical energy, such as through a wind turbine or solar panel. In other embodiments, renewable energy source 34 may be a bio-fuel generator configured to produce electrical energy via bio-fuel energy.

Renewable energy source 34 may be located near the corresponding powered portion 18 of track 12. The area near the powered portion 18 may be considered in determining the type of renewable energy source 34 to be utilized for the corresponding energy exchange station 22. For example, a large, open area near track 12 may be utilized for a wind or solar farm. An area with a body of water near track 12 may utilize a hydro-powered or tidal energy source to supply electrical energy to a powered portion 18.

Regardless of the type of renewable energy source 34, the electrical energy generated may be directed to a trackside location 36 and transformed into a form suitable for storage in energy storage device 30 and/or immediate use at electrical contact 24. In this way, electrical energy from renewable energy source 34 may be accumulated and stored for eventual use in energy storage device 30, even when production of the electrical energy is variable (e.g., solar energy, wind energy, etc.).

It is also contemplated that power source 32 may be a conventional source of electrical energy, such as a power substation 38 that receives electrical energy from a power grid (e.g., energy originating from a power plant that supplies electrical energy to a particular region). The electrical energy from the power grid may be diverted to a trackside location 40 and transformed into a form suitable for storage in energy storage device 30 and/or immediate use at electrical contact 24.

In other embodiments, energy exchange station 22 may include an energy storage device 30 that is not coupled to a local power source. In this embodiment, energy exchange station 22 may receive electrical energy from a connected locomotive 16 utilizing a regenerative braking system (RBS) 54 (shown only in FIG. 2). The electrical energy received from locomotive 16 may be stored at a trackside location 41 in an energy storage device 30 and directed back to the same or another locomotive 16 when needed. It is further possible that electrical energy from one locomotive 16 utilizing RBS 54 may be directed to another locomotive 16 connected to the same electrical contact 24 without ever being stored in energy storage device 30.

In some embodiments, energy exchange stations 22 may be interconnected by a global exchange system 42. Global exchange system 42 may allow energy sharing between energy exchange stations 22. For example, electrical energy generated by an RBS 54 of a locomotive 16 connected to one electrical contact 24 may be directed to one energy exchange station 22 and subsequently supplied to another energy exchange station 22 via global exchange system 42 for storage and/or use by another locomotive 16 connected to the associated electrical contact 24. Global exchange system 42 may connect selected energy exchanges stations 22 via directly-connected power lines, a larger power grid, or other type of electrical connection known in the art.

FIG. 1 further depicts several exemplary configurations of energy exchange stations 22. For example, energy exchange stations 22 may include energy exchange stations 66, 68, and 70. Energy exchange station 66 may include electrical contact 24, energy storage device 30 and power source 32. Power source 32 may be alternative energy source 34.

Energy exchange station 68 may be arranged in the same manner as energy exchange station 66, except power source 32 may be a connection to a power grid, such as through power substation 38. Power substation 38 may transmit electrical energy to trackside location 40 for storage in energy storage device 30. Energy storage device 30 may subsequently transmit electrical energy to locomotives 16 that are passing through the powered section 18 associated with energy exchange station 68.

Energy exchange station 70 is an exemplary energy exchange station 22 that includes an energy storage device 30, but does not necessarily include a power source 32. Energy storage device 30 may receive enough electrical energy from passing locomotives 16 (e.g., via RBS 54) to be transmitted back to other locomotives 16. In some embodiments, energy exchange station 70 may act as a power source. For example, energy exchange station 70 may act as a power source for energy exchange station 68 by directing electrical energy through global exchange system 42.

In some embodiments, powered sections 18 and associated energy exchange stations 22 may be strategically located to take advantage of certain aspects of track 12. For example, energy exchange station 66 may be placed near a train station. In this way, locomotive 16 may be configured to conveniently utilize RBS 54 to transmit electrical energy from locomotive 16 to energy exchange station 66, such as when locomotive 16 approaches the train station. In one embodiment, a locomotive 16 that is slowing down to stop at the train station may produce electrical energy via RBS 54 and transmit that electrical energy to energy storage device 30. Energy storage device 30 may subsequently direct the electrical energy to another locomotive 16 that may be ready to depart or in the process of departing the train station. In this way, energy may be conveniently shared between locomotives 16. It should be understood that locomotives 16 may share electrical energy without directing energy to energy storage device 30 (i.e., sharing electrical energy directly via electrical contact 24).

Similarly, some energy exchange stations 22 (e.g., energy exchange stations 68 and/or 70) may be located on a grade (e.g., hill, mountainous area, etc.). Locomotives 16 that are slowing down to traverse down-grade may produce energy via RBS 54 to be transmitted to a locomotive 16 that is traveling up-grade.

Powered sections 18 may also be strategically located in relation to unpowered sections 20. For example, powered section 18 may be located such that locomotives 16 may receive enough energy from a powered section 18 to traverse the adjacent unpowered section 20 efficiently. That is, powered sections 18 may be spaced such that locomotives 16 may be charged with enough energy to travel to the next powered section 18 without risk of running out of power or arriving with an oversupply of energy that may create an imbalance of energy between energy exchange stations 22.

Locomotives 16 may connect to electrical contact 24 of an energy exchange station 22 for transfer of electrical energy through an electrical contact 44 on locomotive 16 (or an attached railcar). Electrical contact 44 may be an onboard device configured to selectively connect to electrical contact 24 when locomotive 16 is within a powered section 18 of track 12. For example, electrical contact 44 may be a charging shoe 46 for use with electrified rail 26, a pantograph 48 for use with overhead power lines 28, or other pickup device configured to create an electrical connection with electrical contact 24. Electrical contact 44 may be arranged to be automatically connected to electrical contact 24 when locomotive 16 enters a powered section 18, or may await an instruction from an operator or control system.

Figure 2:
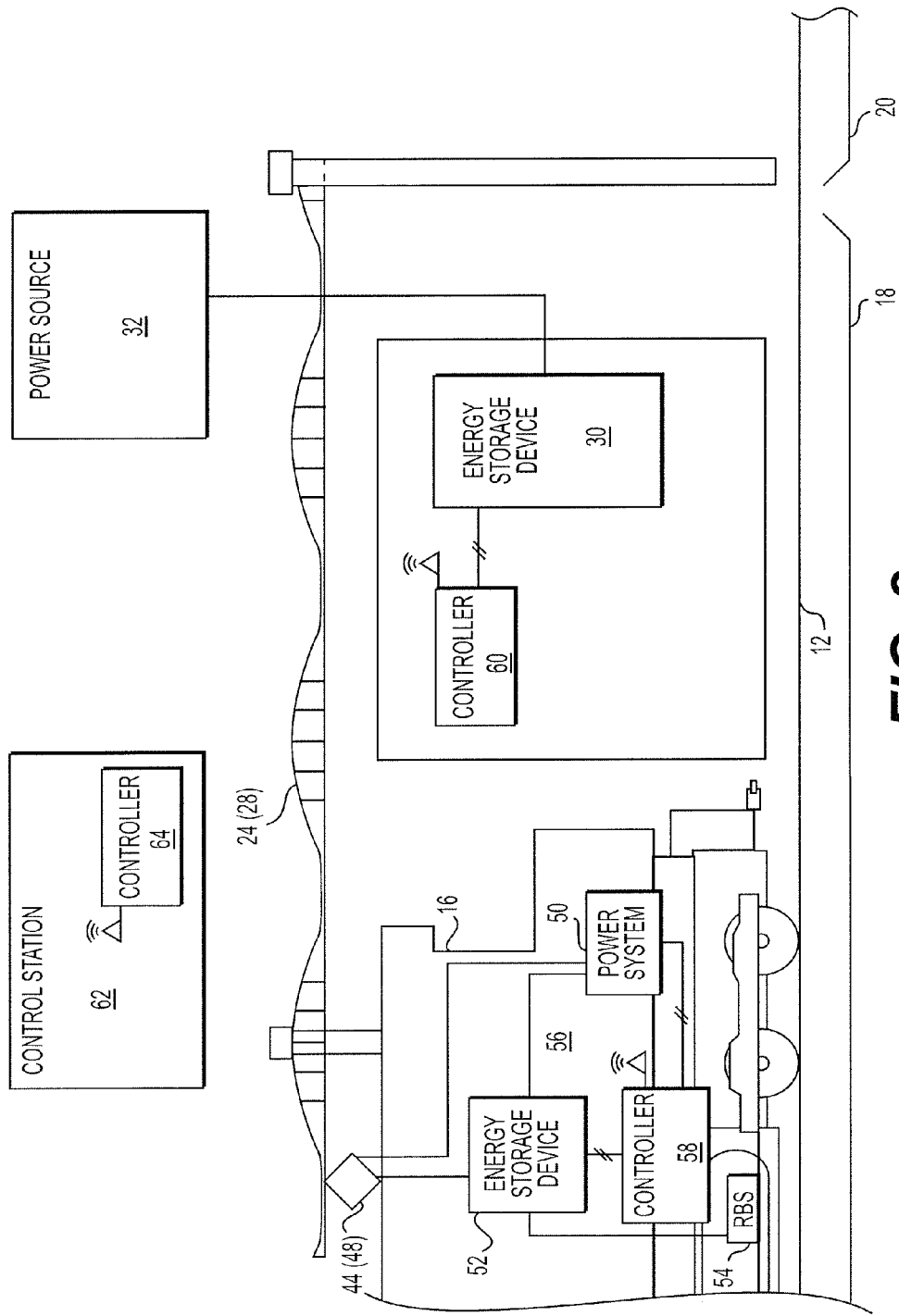
FIG. 2 illustrates an exemplary vehicle, energy exchange station, and control system that may be used in conjunction with the rail system of FIG. 1.

FIG. 2 depicts an exemplary locomotive 16 connected to a powered section 18 of rail system 10. Locomotive 16 may include a power system 50. Power system 50 may include one or more electric motors configured to utilize electrical energy to power traction devices located on locomotive 16 to drive locomotive 16 and any attached rail vehicles on track 12. Power system 50 may be electrically connected to electrical contact 44 such that electrical energy may be supplied to power system 50 through electrical contact 44. In this way, energy from an energy exchange station 22 may be transmitted directly to power system 50 to drive locomotive 16.

In addition to power system 50, locomotive 16 (or a connected railcar), may include one or more energy storage devices 52 for storing energy onboard vehicle 14. In an exemplary embodiment, energy storage devices 52 may include one or more rechargeable batteries configured to receive, store, and transmit electrical energy. In other embodiments, energy storage device 52 may include a mechanical storage system, such as a hydrogen storage system or a mechanical flywheel. A combination of electrical and mechanical energy storage devices 52 is also possible. Energy storage device 52 may be electrically connected to electrical contact 44 and power system 50. In this way, energy storage device 52 may be charged by energy from electrical contact 44 and discharged by power system 50 to drive locomotive 16.

Locomotive 16 may also include a regenerative braking system (RBS) 54. RBS 54 may be configured to convert mechanical energy produced during a braking operation of locomotive 16 (or connected railcar) into electrical energy, in a manner known in the art. RBS 54 may be connected to one or more of electrical contact 44, power system 50, and energy storage device 52. The electrical energy generated by RBS 54 may be transferred to any of these components. For example, electrical energy produced by RBS 54 may be directed to electrical contact 44 for transfer off of locomotive 16, to power system 50 for driving locomotive 16, and/or to energy storage device 52 for increasing the supply of stored energy onboard locomotive 16.

As further depicted in FIG. 2, rail system 10 may include one or more control systems 56 configured to electronically control components of rail system 10. Locomotive 16 and energy exchange station 22 may each include a controller 58, 60, respectively. Control system 56 may also include a control station 62 with a controller 64. Controllers 58, 60, 64 may be connected to each other via a wireless network, such that each can electronically communicate with each other. In other embodiments, one or more controllers 58, 60, and 64 may be connected via a wired connection.

Controllers 58, 60, 64 may each include one or more computing devices such as one or more microprocessors. For example, each controller 58, 60, 64 may embody a general microprocessor capable of controlling numerous machine or engine functions. Each controller 58, 60, 64 may also include all of the components required to run an application such as, for example, a computer-readable memory, a secondary storage device, and a processor, such as a central processing unit or any other means known. Various other known circuits may be associated with controllers 58, 60, 64, including a power source and other appropriate circuitry.

Control station 62 may be a global control center configured to oversee operation of rail system 10. For example, control station 62 may include systems and/or operators that monitor and control locomotives 16, energy exchange stations 22, and other onboard and offboard equipment. In other embodiments, control station 62 may be a local control center configured to control operation of a particular energy exchange station 22 and locomotives 16 that pass through or nearby. Control station 62 may be part of an overall rail control system known in the art, such as positive train control and/or automated train control systems.

In the exemplary disclosed embodiment, control system 56 may include processes and operations to coordinate energy sharing between energy exchange stations 22 and locomotives 16. As has been described, each powered section 18 of track 12 may include an energy exchange station 22 that is configured to transmit energy to and receive energy from locomotives 16 that are connected to energy exchange station 22 via electrical contacts 24 and 44. Control system 56 may implement various control processes and operations to determine energy requirements of components of rail system 10 and distribute the available energy accordingly.

Figure 3:
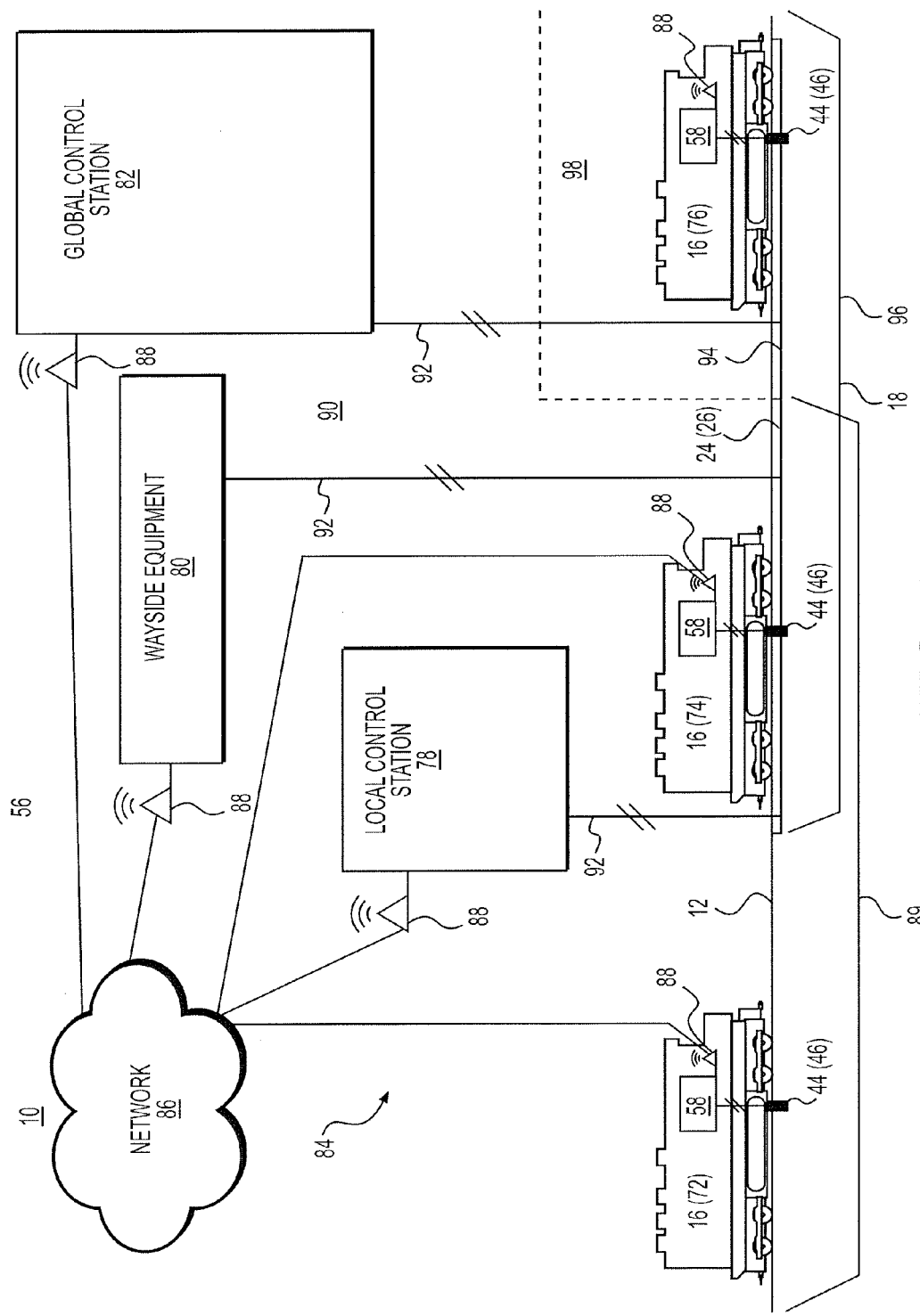
FIG. 3 illustrates an exemplary communication system that may be used in conjunction with the rail system of FIG. 1.

FIG. 3 depicts another exemplary configuration of control system 56. In the depicted embodiment, control system 56 may include controllers 58 located onboard locomotives 16 (such as locomotives 72, 74, and 76), at least one local control station 78, wayside equipment 80, and global control station 82. Local control station 78 and global control station 82 may be structures located near or away from track 12 in which operators and/or electronic controllers oversee movement of locomotives 16 throughout rail system 10. Local control station 78 may focus on rail vehicle traffic within a particular area, while global control station 82 may manage a wider area, such as the entire rail system 10. It is also contemplated that global control station 82 may be a global control system with components onboard and offboard locomotive 16. For example, global control station 82 may be a train control system known in the art, such as automatic train control or positive train control. Controller 58 may be a train management computer (TMC) that communicates with the offboard components of the global control system to implement one or more of these train control systems. In some embodiments, only one of local control station 78 and global control station 82 may be necessary to manage rail system 10. Wayside equipment 80 may include various control devices, such as axle hot box detectors, wheel load detectors, track switches, speed restriction signs, signal lights, or other signal devices configured to manage rail vehicle traffic in rail system 10.

Local control station 78, wayside equipment 80, and global control station 82 may coordinate (via operators and/or controllers associated with each entity) with controllers 58 to manage movement of locomotives 72, 74, 76 on track 12. For example, control system 56 may implement positive train control. In order to implement the control processes associated with control system 56, a communication system 84 may be configured to manage data communication within rail system 10.

Communication system 84 may include a wireless network 86. Wireless network 86 may be any type of network (including infrastructure) that provides communications, exchanges information, and/or facilitates the exchange of information, such as the Internet, a Local Area Network, or other suitable connection(s) that enables the sending and receiving of information between the components of communication system 84. Controllers 58, local control station 78, wayside equipment 80, and global control station 82 may each include a device, such as an antenna 88, configured to connect with wireless network 86 in a manner known in the art. The portion of track 12 in which wireless network 86 is available may be considered wireless communication zone(s) 89.

Wireless network 86 may facilitate the transmission of messages between components of rail system 10. These messages may include status/condition messages, speed restrictions, trip instructions, energy exchange messages, etc., that are transmitted between a locomotive 16 and one or more of local control station 78, wayside equipment 80, and global control station 82. In addition, locomotives 16 may communicate with other locomotives 16 via controllers 58 connected to wireless network 86.

Wireless network 86 may be limited to managing communication within a particular area of rail system 10. This may be due to a range restriction that prevents wireless communication outside of a particular area and/or a communication barrier that interferes with wireless signals, which could be a physical barrier (e.g., a tunnel) or an electronic barrier (e.g., data traffic). These areas in which components of control system 56 are incapable of reliably connecting to wireless network 86 may be considered "dead zones" (e.g., dead zone 98). In order to facilitate communication within dead zone 98, communication system 84 may include a wired network 90.

Wired network 90 may include a plurality of physical communication links, such as transmission lines 92, configured to transmit data communications between components connected to the physical communication link, in a manner known in the art. Wired network 90 may manage data communication between components of control system 56 in substantially the same manner as wireless network 86, except for the data being transmitted over transmission lines 92, instead of wirelessly. Transmission lines 92 may be arranged to connect any components of rail system 10 that may use wired communication. It should be understood that the connections depicted by transmission lines 92 in FIG. 2 are only exemplary, and other connections are contemplated, such as wired connections between local control station 78 and wayside equipment 80.

Locomotives 16 (i.e., controllers 58) may connect to wired network 90 via transmission line 94. In an exemplary embodiment, transmission line 94 corresponds to a wired communication zone 96. That is, transmission line 94 only runs along a particular length of track 12. As locomotive 16 enters wired communication zone 96, an electronic connection to transmission line 94 may be made to allow locomotive 16 to communicate with other components of wired network 90.

In an exemplary embodiment, transmission line 94 may be electrical contact 24. For example, transmission line 94 may be electrified rail 26, configured to serve a dual purpose of transmitting electrical energy and acting as a communication link between the associated locomotive 16 and one or more components of wired network 90, such as wayside equipment 80. Locomotive 16 may transmit data communication to electrical contact 24/transmission line 94 via electrical contact 44, such as charging shoe 46.

Electrical contact 24 may act as transmission line 94 in a manner known in the art. For example, controller 58 and one or more of local control station 78, wayside equipment 80, and global control station 82 may include modulation devices configured to translate data communications (e.g., data signals) into forms that can be transmitted over electrical contact 24, including translating a received modulated communication into a form that is usable by the receiving entity (e.g., software instructions understood by controller 58).

Wired communication zones 96 may correspond to powered sections 18 of rail system 10 depicted in FIG. 1. That is, powered sections 18 and wired communication zones 96 may be coextensive portions of track 12. In some embodiments, unpowered sections 20 and wireless communication zones 89 are also coextensive portions of track 12. In other embodiments (e.g., the embodiment depicted in FIG. 3), a wireless communication zone 89 may be made up of a portion of track 12 that includes at least a portion of an unpowered section 20 and at least a portion of a powered section 18. In these instances, an overlapping zone is created in which both wireless network 86 and wired network 90 are available.

Locomotives 16 on track 12 may depend on wireless network 86 for data communication while in unpowered sections 20, but may have the option (or be required) to rely on wired network 90 for data communication while in powered sections 18. In addition, each wired network 90 may be integrated into an energy exchange station 22. For example, local control station 78 may be located at trackside location 36, 40, and/or 41 of FIG. 1.

In the embodiments in which powered sections 18 correspond to wired communication zones 96, placement of powered sections 18 within rail system 10 may be influenced by the location(s) of dead zones within rail system 10. For example, a powered section 18 may be located in a tunnel, since wired communication may be preferred in tunnels to increase reliability. In another example, a powered section 18 may be located in a high-wireless-traffic area, to reduce the volume of wireless communications by also allowing for wired communication.

Components of control system 56 may communicate with each other to coordinate communications over wireless network 86 and wired network 90, including switching between each network when appropriate. Exemplary processes for data communication over communication system 84, via wireless network 86 and wired network 90, are described in more detail below.

Industrial Applicability

The disclosed embodiments may be applicable to any system in which data communication is transmitted between two or more components of a control system. The disclosed communication system may be particularly applicable to transportation systems, such as rail system 10. Integration of communication system 84 into rail system 10 as described herein may optimize data communication between control system components by strategically positioning wired communication zones at wireless dead zones. The exemplary disclosed embodiments of rail system 10 may be applicable to an existing or new rail system. In addition to communication system 84, existing rail systems may be modified or new rail systems may be constructed to include energy exchange stations 22, which may be beneficial, for example, by allowing existing rail vehicles to obtain energy from renewable resources and allowing different rail vehicles to share electrical energy. Further, the inclusion of unpowered sections (e.g., unpowered sections 20) and relatively short powered sections (e.g., powered sections 18) may reduce the infrastructure required to provide power to rail vehicles in the rail system. Exemplary processes for using the disclosed rail system 10 to achieve these benefits are described in more detail below.

As a locomotive 16 enters a powered section 18 associated with an energy exchange station 22, electrical contact 44 may be electrically connected to electrical contact 24 (e.g., charging shoe 46 connects to electrified rail 26) and power transmission between locomotive 16 and energy exchange station (in either direction) may be initiated. Power transmission may continue until locomotive 16 leaves powered section 18 and enters the next unpowered section 20 or a threshold power transmission is reached. Locomotive 16 may then travel on unpowered section 20 via electrical energy received from energy exchange station 22.

While traveling on track 12, locomotive 16 may utilize communication system 84 to implement various control processes, including processes associated with exchanging energy with an energy exchange station 22. Locomotive 16 may use wireless network 86 for data communication while traveling on unpowered sections 20. When locomotive 16 enters a powered section 18/wired communication zone 96, connection of electrical contacts 24, 44 may allow for data transmission, in addition to the above-described power transmission. In an exemplary embodiment, controller 58 (or other controller associated with control system 56) may switch between wireless network 86 and wired network 90 for use in transmitting a data communication based at least in part on a location of locomotive 16. That is, controller 58 may determine whether locomotive 16 is within or approaching wireless communication zone 89 or wired communication zone 96 and select wireless network 86 or wired network 90 for data transmission, accordingly. In this way, locomotive 16 may appropriately transmit data communications regardless of its location on track 12. In some embodiments, controller 58 may also switch between communication networks based at least in part on whether locomotive 16 is within or approaching a powered section 18 or unpowered section 20.

FIG. 3 depicts locomotives 72, 74, 76 at various locations along track 12. Locomotive 72 may be traveling within unpowered section 20, communicating with one or more of local control station 78, wayside equipment 80, and global control station 82. Controller 58 (or other controller associated with control system 56) may determine that locomotive 16 is in wireless communication zone 89. Therefore, controller 58 may send and receive data communications via wireless network 86. For example, local control station 78 may send a wireless signal to controller 58 onboard locomotive 72 via wireless network 86, instructing locomotive 78 to reduce speed. Similarly, locomotive 72 or global control station 82 may send a wireless signal to wayside equipment 80 via wireless network 86, such as to change the position of a track switch. In another example, wayside equipment 80 may send a high wheel load signal to locomotive 72 via the wireless network, alerting them to problem axles in an associated train.

As a locomotive 16 enters powered section 18/wired communication zone 96, it may reach the position of locomotive 74. Locomotive 74 may have an associated electrical contact 44 electrically connected to electrical contact 24. Electrical contact 24 may act as transmission line 94 to allow for wired transmission of a data communication. In the embodiment depicted in FIG. 3, locomotive 74 may be in a position on track 12 in which both wireless and wired communication may be possible. For example, locomotive 74 may still be in range of wireless network 86 and electrically connected for wired transmission via transmission lines 92, 94. In this case, controller 58 may determine which of wireless network 86 and wired network 90 to use for data communications. Controller 58 may consider various factors, such as message importance, bandwidth size, and wireless traffic when determining which communication network to use.

As a locomotive 16 travels through a powered section 18/wired communication zone 96, communication via either of wireless network 86 and wired network 90 may continue until wireless network 86 is no longer in range, such as at the position of locomotive 76 within dead zone 98. As locomotive 76 approaches dead zone 98, controller 58 may determine the location of locomotive 76 to be in wired communication zone 96 and arrange for wired-only communication. For example, controller 58 may signal to an operator that dead zone 98 is approaching, so that the operator may switch all communication over to wired network 90. It is also contemplated that controller 58 may automatically switch communication networks. In other exemplary embodiments, a controller associated with global control station 82 may send a signal to the operator alerting them of dead zone 98 or automatically switch communication to wired network 90.

As locomotive 76 travels within dead zone 98, data communication may be managed over wired network 90. Messages may be transmitted between one or more of local control station 78, wayside equipment 80, global control station 82, and locomotive 76 via transmission lines 92, 94. For example, global control station 82 may send a speed restriction signal to locomotive 76 and/or wayside equipment 80 via wired network 90. Similarly, locomotive 76 may communicate with locomotive 74 directly via transmission line 94. For example, locomotive 76 and locomotive 74 may each include a TMC configured to communicate with one another via transmission line 94 to implement positive train control.

Locomotive 76 may also communicate with locomotive 72 (or other entity only available wirelessly), via an intermediary connection, such as global control station 82, which may receive a data communication from locomotive 76 via wired network 90, and which may forward the data communication wirelessly to locomotive 72 (or other destination) via wireless network 86. Locomotive 76 may receive inbound data communications from locomotive 72 (or other entity only available wirelessly) in a similar manner.

As locomotive 16 approaches the end of dead zone 98, controller 58 may send a signal to an operator that communication via wireless network 86 (or another wireless network not shown) is or may soon be available. As locomotive 16 leaves powered section 18 and enters the next unpowered section 20 (not shown), all communication may be switched to use wireless network 86 until another wired communication zone 96 is reached.

The exemplary disclosed embodiments implement an energy exchange system that eliminates costs that are associated with other electrical power systems. In addition, the exemplary disclosed communication system 84 overcomes problems associated with other rail system communication systems, since both wireless and wired networks are made available to a rail vehicle operator. In particular, the use of wired communication zones 96 allows for reliable high-bandwidth data communication when wireless communication is otherwise unavailable or less reliable.

In addition, the integration of wired communication zones 96 into powered sections 18 provides a simple approach to implementing wired network 90 without incurring many additional expenses. For example, use of electrical contact 24 as transmission line 94 allows for wired communication without the additional costs associated with installing a transmission line. Further, the placement of powered sections 18 around wireless dead zones addresses the need for wired-only communication in certain areas within rail system 10. Intermediary connections may be used to coordinate data communication via both wired and wireless networks, which may allow for communication over an expansive area.

It will be apparent to those skilled in the art that various modifications and variations can be made to the rail system of the present disclosure without departing from the scope of the disclosure. Other embodiments will be apparent to those skilled in the art from consideration of the specification and practice of the embodiments disclosed herein. It is intended that the specification and examples be considered as exemplary only, with a true scope of the disclosure being indicated by the following claims.

What is claimed is:

1. A rail system, comprising:
   a track including a wireless communication zone, a wired communication zone, and a dead zone that is within the wired communication zone;
   an electrical contact that extends along the wired communication zone and is configured to transmit electrical energy and a data communication;
   a power source electrically connected to the electrical contact;
   a controller selectively electrically connectable to the electrical contact and a wireless network;
   wherein:
   the power source is configured to transmit electrical energy through the electrical contact; and
   the controller is configured to:
   determine that a rail vehicle is approaching the dead zone, and
   switch from data communication transmission via the wireless network to data communication transmission via the electrical contact, based at least in part on the determination that the rail vehicle is approaching the dead zone.

2. The rail system of claim 1, wherein the track further includes a powered section and an unpowered section, wherein the electrical contact extends along the powered section.

3. The rail system of claim 2, wherein the powered section and the wired communication zone are coextensive portions of the track.

4. The rail system of claim 3, wherein the unpowered section and the wireless communication zone are coextensive portions of the track.

5. The rail system of claim 3, wherein the wireless communication zone is made up of a portion of the track that includes at least a portion of the unpowered section and at least a portion of the powered section.

6. The rail system of claim 2, wherein the dead zone is a tunnel through which the track extends.

7. The rail system of claim 1, further including an energy exchange station electrically connected to the electrical contact.

8. The rail system of claim 7, wherein the energy exchange station is configured to:
   initiate power transmission between the energy exchange station and a rail vehicle, through the electrical contact, when the rail vehicle is on the powered section of the track; and
   discontinue power transmission between the energy exchange station and the rail vehicle when the rail vehicle leaves the powered section of the track.

9. The rail system of claim 1, wherein the electrical contact is one of an electrified rail and an overhead catenary.

10. A method of operating a rail system, comprising:
    selectively connecting a controller to a wireless network;
    transmitting a first data communication to or from the controller over the wireless network;
    selectively connecting an electrical contact to a rail vehicle while the rail vehicle travels on a powered section of a track;
    initiating power transmission to or from the rail vehicle via the electrical contact at selected times when the rail vehicle is traveling on the powered section of the track;
    determining that the rail vehicle is approaching a dead zone; and
    transmitting a second data communication to or from the controller via the electrical contact, based at least on the determination that the rail vehicle is approaching the dead zone.

11. The method of claim 10, wherein the electrical contact is one of an electrified rail and an overhead catenary.

12. The method of claim 10, wherein transmitting the second data communication to or from the controller via the electrical contact includes transmitting the second data communication between two rail vehicles which are both electrically connected to the electrical contact.

13. The method of claim 10, further including discontinuing power transmission to or from the rail vehicle via the electrical contact when the rail vehicle leaves the powered section of the track and travels on an unpowered section of the track.

14. The method of claim 13, wherein the first data communication is transmitted when the rail vehicle is traveling on the unpowered section of the track.

15. The method of claim 13, wherein the first data communication is transmitted when the rail vehicle is traveling on the powered section of the track.

16. The method of claim 10, wherein the second data communication is transmitted when the rail vehicle is traveling in the dead zone.

17. The method of claim 10, further including at least one of:
    forwarding the first data communication through the electrical contact; and forwarding the second data communication through the wireless network.

18. A rail system comprising:
a track including a wireless communication zone, a wired communication zone, a powered section, an unpowered section, and a dead zone that is within the wired communication zone;
an electrical contact that extends along the powered section and the wired communication zone;
an energy exchange station electrically connected to the electrical contact;
a rail vehicle configured to travel on the track and be electrically connected to the electrical contact;
a controller selectively electrically connectable to the electrical contact and a wireless network;
wherein:
   the energy exchange station is configured to:
      initiate power transmission between the energy exchange station and the rail vehicle, through the electrical contact, when the rail vehicle is on the powered section of the track; and
      discontinue power transmission between the energy exchange station and the rail vehicle when the rail vehicle leaves the powered section of the track; and
   the controller is configured to:
      determine that the rail vehicle is approaching the dead zone, and
      switch from data communication transmission via the wireless network to data communication transmission via the electrical contact, based at least in part on the determination that the rail vehicle is approaching the dead zone.

* * * * *